Figure 1:
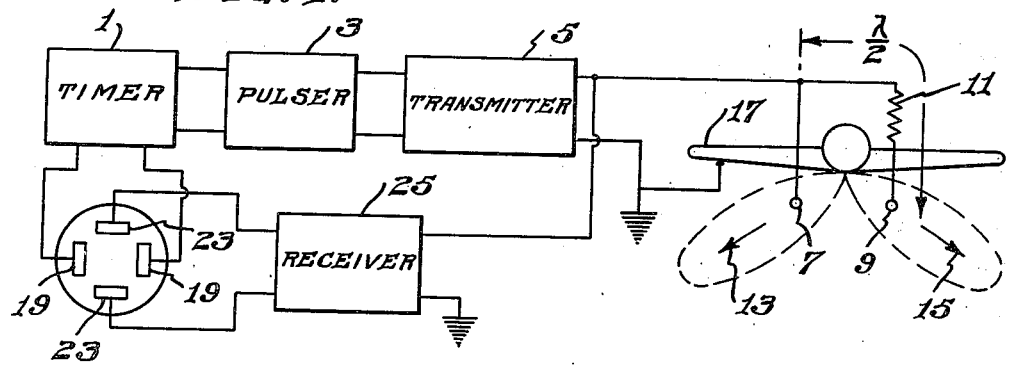

July 9, 1946.  I. WOLFF  2,403,625
DRIFT INDICATOR
Filed Aug. 16, 1940  2 Sheets-Sheet 1

Inventor
Irving Wolff
By
Attorney

July 9, 1946.　　　　I. WOLFF　　　　2,403,625

DRIFT INDICATOR

Filed Aug. 16, 1940　　　2 Sheets-Sheet 2

Inventor
Irving Wolff
By
Attorney

Patented July 9, 1946

2,403,625

UNITED STATES PATENT OFFICE 2,403,625

DRIFT INDICATOR

Irving Wolff, Merchantville, N. J., assignor to Radio Corporation of America, a corporation of Delaware Application August 16, 1940, Serial No. 352,845

18 Claims. (Cl. 250—2)

This invention relates to drift indicators, and especially to drift indicators for aircraft in which radio frequency energy is radiated along paths extending downwardly in opposite directions. The difference between the frequency of the energy transmitted and received over each of said paths is due to a phenomena known as the Doppler effect and is a measure of the drift of the aircraft with respect to the surface of the earth.

The method of obtaining indications of the drift of an airplane by the changing frequency of reflected radio frequency energy has been described in the copending application of William D. Hershberger, Serial No. 232,631, filed September 30, 1938, for "Obstacle detection by radio waves." That application describes a method of measuring the drift of an airplane by radiating a pulse of radio frequency energy, receiving said pulse after its reflection, and obtaining currents of a frequency proportional to the difference in frequency of the radiated pulse and the received pulse.

In a system of the kind described in the Hershberger application, the accuracy of indication depends largely upon the maintenance of constant frequency at the transmitter so that the difference in frequency is accurately determined. Any variation of the original frequency of the transmitted energy cannot be distinguished from the variation of frequency due to the Doppler effect. While numerous arrangements are known to those skilled in the art for maintaining constant frequency, these arrangements are not without difficulties, especially at the ultra high frequencies usually employed for pulse echo work.

It is an object of the present invention to provide improved means for indicating the drift of an aircraft. Another object is to provide means for radiating radio frequency energy along downwardly and oppositely extending paths so that the frequency of the energy received over one of said paths may be compared to the frequency of the energy received over the other of said paths to indicate drift as a function of the difference frequency. Another object of the invention is to provide means for indicating drift by means of a method in which radio frequency energy is propagated in divergent paths, preferably directively received after reflection from surfaces intercepting said paths, limiting the received energy, and producing a difference frequency to indicate drift.

Additional objects are to provide means for separating and for selecting the indication corresponding to the reflections obtained at a predetermined angle to the vertical. A still further object is to provide convenient means for determining the said angle.

A wave projected downwardly will be reflected from a plurality of points on the surface of the earth. Each of these reflections will have a frequency associated with it which will depend upon the component of the motion of the aircraft in the direction of the line joining the reflecting point and the aircraft. This will lead to a plurality of Doppler effects which would be superposed and would cause confusion. Means should be provided to separate these effects. It might be presumed that narrow beams of radiation could be employed, but it is not practical on aircraft to use antennas having sufficient directivity.

The problem is solved by using sharply defined radio frequency pulse transmission. The receiver is provided with means including a timing sweep. The received reflected signals appear along the timing sweep so that the received signals producing the Doppler effects are spread out along the sweep as a function of the distance of propagation. Thus, the Doppler effect signals may be separated. Some of these indications correspond to the pulses propagated and reflected along the paths having angles most convenient for calculating the drift due to the difference frequency. By one system, these signals are selected by either orienting a photocell with respect to the reflections or by adjusting the timing scale to the photocell. While the use of a timing sweep is helpful in selecting the proper paths, it is desirable to employ some directivity of the radiation. If no directivity is used, the signals corresponding to a selected distance will come from the reflections from the earth intersecting the base of a cone whose axis is vertical to the aircraft. It has been assumed that the earth's surface over the region considered is substantially flat. Although the component of the velocity being determined is different for different points on the circle of intersection, it can be shown that the component varies only slowly in terms of the angle with respect to any specified direction in which the velocity is to be determined so that only moderate azimuthal directivity is required. This directivity is well within practical limits.

Figure 2:
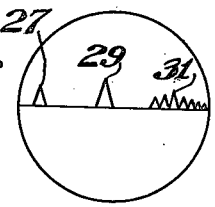
Figure 6:
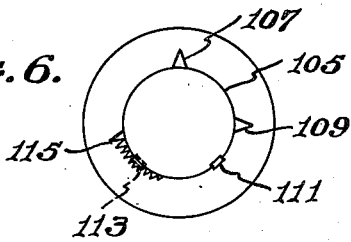
Figure 3:
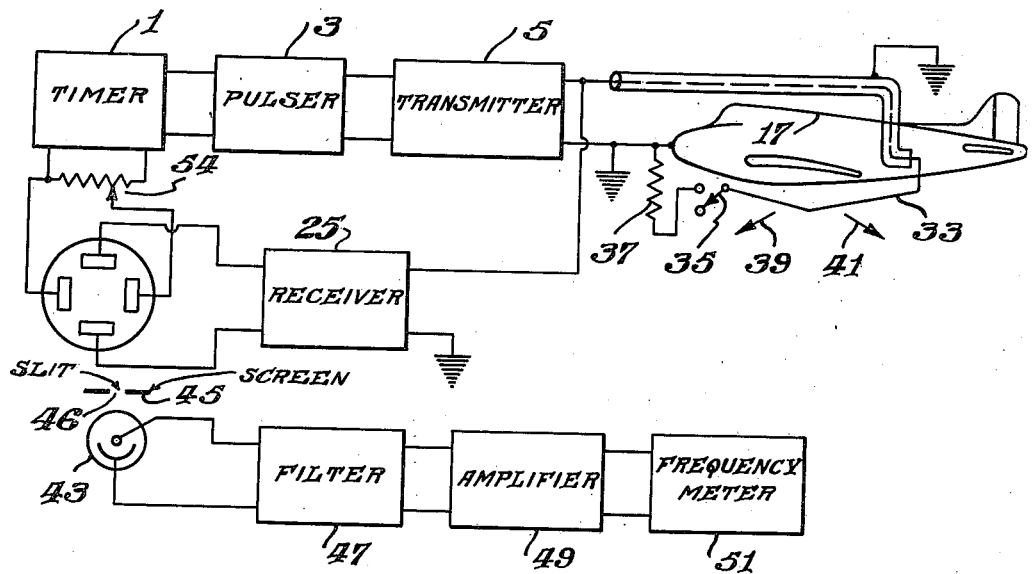
Figure 4:
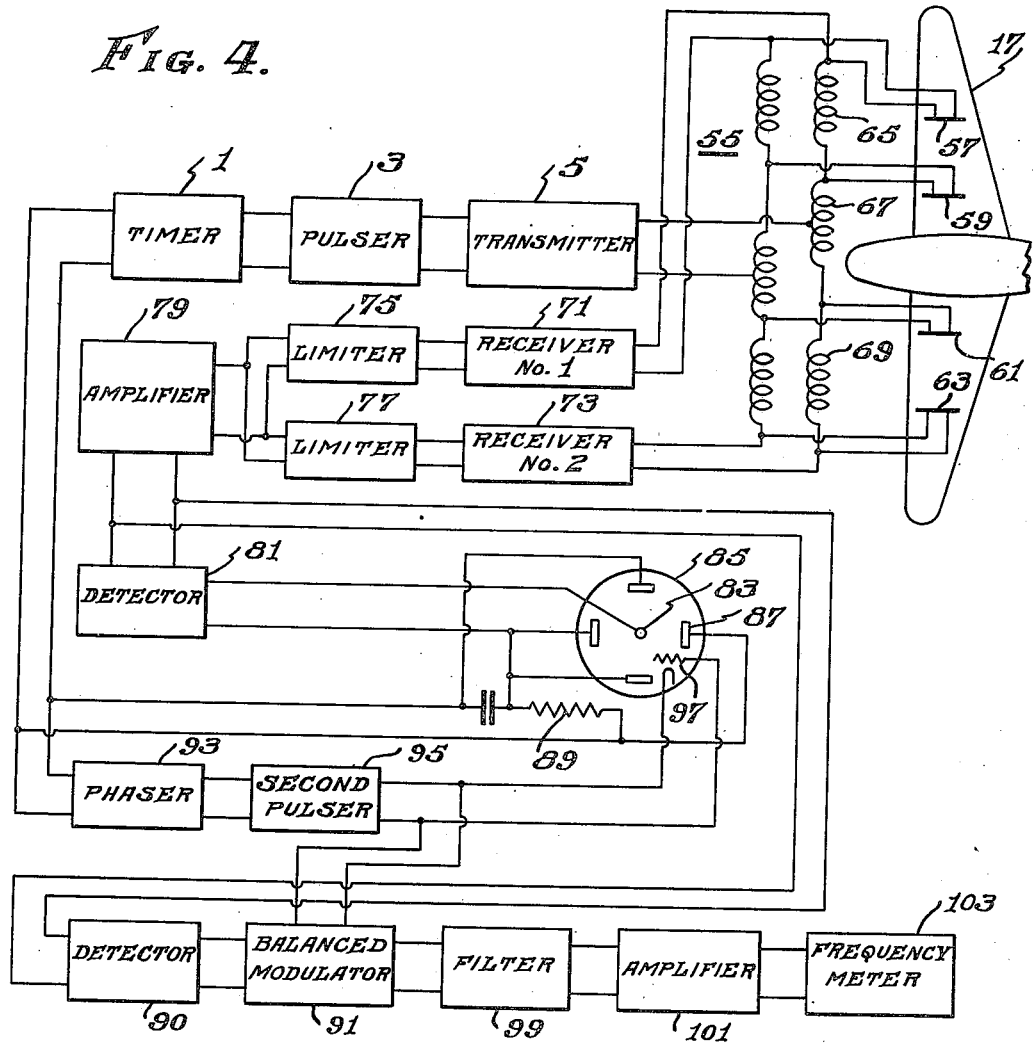
Figure 5:
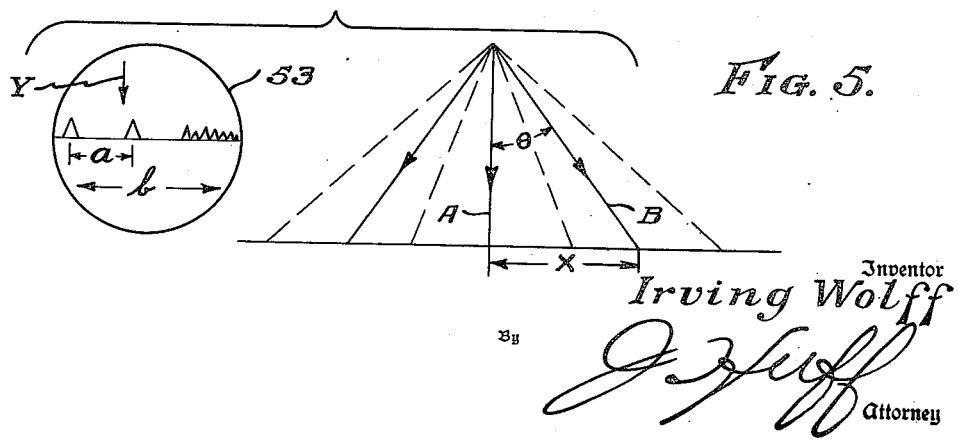

The invention will be described by reference to the accompanying drawings in which Figure 1 is a schematic diagram of one embodiment of the invention; Figure 2 is a graphic illustration of the indications received by the circuit arrangement of Figure 1; Figure 3 is a schematic circuit diagram of another embodiment of the invention; Figure 4 is a schematic circuit diagram of a preferred embodiment of the invention; Figure 5 is a graphic illustration used in describing the invention; and Figure 6 is a graphic illustration of the indications received by the circuit arrangement of Fig. 4. Similar reference characters will be applied to similar elements in the several figures.

Referring to Fig. 1, a timer 1 is connected to a pulser 3 which is used to key a transmitter 5. The transmitter is connected to a pair of directive antenna arrays 7, 9. The connection to one of the arrays 9 is preferably made of the order of half a wave length greater than the connection to the other 7 antenna array. The half wave connection preferably includes an attenuating means 11. While the antenna arrays radiate the applied radio frequency energy along divergent paths 13, 15, it should be understood that some of the energy is radiated directly downward from the airplane 17 on which the device is mounted. It should be understood that the airplane wings may be used as reflecting surfaces to increase the directivity of the arrays. It will be observed that in the instant arrangement the response patterns of the arrays are symmetrically disposed with respect to a vertical plane passing through the longitudinal axis of the craft.

The timer 1 is connected to the horizontal deflecting electrodes 19 of a cathode ray tube 21. The vertical deflecting electrodes 23 of the cathode ray tube are connected to the output of a radio receiver 25 which is connected to the antenna system previously described. The system may include means for preventing overloading of the receiver by the direct application of currents from the transmitter. One such means is disclosed in the copending application of I. Wolff and W. D. Hershberger, Serial No. 184,354, filed January 11, 1938, for "Signalling system."

In the operation of the foregoing system, pulses of radio frequency energy are radiated directively from the two antenna arrays. These pulses, after reflection from surfaces intercepting the paths, are received on the antenna arrays, and applied to the receiver 25. On the fluorescent screen of the cathode ray tube, several indications may be observed as indicated in Fig. 2. The horizontal coordinate of Fig. 2 is a time base corresponding to distance. The first vertical deflection 27 corresponds to the outgoing pulse. The second vertical deflection 29 corresponds to the pulse received over the shortest path from the airplane to ground and indicates the altitude of the plane. The third vertical deflection 31 includes a plurality of traces corresponding to the several reflections from energy in the diverging paths 13, 15. If the energy could be confined to a very narrow angle only a single reflection would be obtained with a particular beat frequency. The angle formed by a perpendicular line to the earth's surface and the line of said reflection will be called the angle of declination. In any event, the angle of radiation should be made sharp enough to provide an optimum beat frequency effect. In the normal cathode ray tube, the fluctuations due to the Doppler effect may occur much more rapidly than may be followed by an observer. Therefore, means will be provided to indicate the beat frequency. Such means will be described in connection with Fig. 3.

Referring to Fig. 3, insofar as the timer, pulser, transmitter, receiver, and cathode ray tube are concerned, the circuit of Fig. 3 corresponds to that of Fig. 1. In Fig. 3 the antenna system may be made to correspond to that of Fig. 1, but in the instant arrangement a half rhombic antenna is used because of the convenience of installation. The antenna consists of a conductor 33 which extends from a point near the tail of the airplane to a point near the nose. The antenna is provided with a switch 35 by means of which the antenna may be unterminated or may be terminated in a resistance 37. When the antenna is not terminated, the applied energy is radiated over the diverging paths corresponding to the arrows 39, 41. When the antenna is terminated, the radiation to the rear is suppressed and the forward radiation corresponding to the arrow 39. It will be observed that a photoelectric cell 43 has been arranged near the cathode ray tube with a screen 45 including a slit 46 interposed therebetween. The photoelectric cell is connected through a filter 47 and an amplifier 49 to a frequency meter 51. The light from the trace on the fluorescent screen of the cathode ray tube passes through the slit 46 in the screen 45 and falls upon the photoelectric cell 43. The drift representing traces 31, which appear fixed to the eye of an observer, are actually varying at the beat or Doppler frequency. The screen may be moved along the trace 31 to select a desired Doppler effect, as described hereinafter. In any event, the varying light falling on the photocell establishes current variations at a frequency corresponding to the Doppler frequency. These current variations are filtered from the pulse frequency, amplified and applied to the frequency meter 51, which is preferably of the electron counter type.

The switch 35 is connected to the terminating resistor 37 to detect reflecting objects or to determine the character of waves on a water surface without disturbance from the Doppler effects obtained when the switch is opened for bidirectional radiation.

If the photoelectric cell were arranged with the circuit of Fig. 1 and the airplane is assumed to stand still, there would be no beats because the distances would not be changing. The received frequency would be equal to the transmitted frequency and the same from both paths. The waves in both paths correspond to the waves radiated at the same time from the same source. If the airplane was following a course in which drift to the right or left was experienced, the path length on one side of the course would be decreasing and that on the other side would be increasing, leading to an increase of frequency on the decreasing side and a decrease of frequecy on the increasing side. When the energy received after reflection from the two paths is combined, a different frequency will indicate the presence of drift. This difference frequency may be expressed by the following formula:

$$\Delta f = \frac{4fs \sin \theta}{c}$$

in which $\Delta f$ = the frequency due to the Doppler effect,
$f$ = the frequency corresponding to the transmitted carrier,
$s$ = the ground speed of the craft carrying the device, and
$c$ = the velocity of light.

It will be noted that the ground speed of the craft may be compared to the air speed to indicate drift. It should also be noted that the relation between the ground speed $s$ and the Doppler frequency $\Delta f$ depends upon the angle and ordinarily requires calculation. In order to make the computation easy, reference will be made to Fig. 5.

In Fig. 5, the altitude of the craft is indicated by the length of the vector line A. The length of the vector line B corresponds to the distance from the plane to the point at which the reflection of the radio frequency energy produces the usable Doppler indication. The angle between the vectors A and B is $\theta$.

Referring to the illustration 53, it will be seen that the distance $a$ corresponds to the altitude of the aircraft, while the distance $b$ corresponds to the path length B. The following relation occurs:

$$\sqrt{\frac{b^2-a^2}{c}}=\frac{X}{B}$$

If the timing scale of the cathode ray tube is adjusted to maintain the distance $a$ at a predetermined setting Y so that a satisfactory Doppler effect will be indicated by the photoelectric cell with its slit located at the distance $b$, the effect of the angle may be eliminated from the observations. In other words, instead of calculating the effect of the altitude on the formula, the operator of the device adjusts a potentiometer 54 regulating the timing scale so that the altitude deflection corresponds to Y, whereby the frequency meter may be calibrated directly in terms of drift in miles per hour. Of course, knowing the drift, the ground speed can be determined, or if the ground speed is indicated and the air speed is known, the drift may be calculated.

In the foregoing discussion, no consideration has been given to the algebraic sign of the drift; that is, the drift may be to the right or left of the course. This may be determined by slipping or skidding the plane first to the right and then to the left. Such skidding or slipping will show a decreased drift when the skid is in the direction opposite to the drift.

A preferred embodiment of the invention is shown in Fig. 4. In this arrangement, the transmitter is connected to the center of a wave antenna system 55. The antenna system includes a plurality of directive arrays 57, 59, 61, 63 which are mounted on the under side of the wing of the aircraft. Retarding sections 65, 67, 69 are connected between the successive arrays. In this arrangement, the transmitted energy will be directed along divergent paths as in the case of previously described systems. The received energy is derived by connecting a first receiver 71 to one terminal of the array and a second receiver 73 to the other terminal of the array so that the response characteristic of the arrays diverge in opposite directions with respect to the two receivers. The receivers are connected respectively to limiters 75, 77. The output of the limiters is added, and is impressed on an amplifier 79 which is connected to a detector 81. The detector output is applied to a radial deflecting electrode 83 in the cathode ray tube 85. The horizontal and vertical deflecting elements 87 of the tube are connected to a phase splitting circuit 89 which is, in turn, connected to the timer 1.

The output of the amplifier 79 is also applied to a detector 90 and a balanced modulator 91. The balanced modulator is connected to the timer 1 through a phaser 93. The phaser output controls a pulser 95. The pulser 95 is connected to the grid 97 of the cathode ray tube and to the input of the balanced modulator 91. The output of the balanced modulator is connected through a filter 99 to an amplifier 101. The amplifier output is applied to a frequency meter 103.

The operation of the circuit of Fig. 4 is somewhat different from that of the preceding circuits. In the present circuit, the cathode ray is deflected over a circular path 105 as shown in Fig. 6. The initial pulse of the transmitter produces a radial deflection 107. The second radial deflection 109 corresponds to the altitude of the aircraft, which may be determined as described in the operation of the copending application of William D. Hershberger, Ser. No. 399,608. The spot 111 of increased intensity represents the pulse applied to the grid of the cathode ray tube by the second pulser. The angular displacement of the spot of increased brilliance may be adjusted by the phaser 93 so that the spot 111 may be moved to the position indicated by reference character 113 to correspond to the trace 115 produced by a satisfactory Doppler effect. Unless the phaser 93 has been thus adjusted so that the second pulse corresponds in time phase to the satisfactory Doppler effect, the balanced modulator will fail to pass the desired signals from the detector 90 to the frequency meter 103. It follows, therefore, that a suitable adjustment of the phaser 93 corresponds to the movement of the photoelectric cell and slit. The angle which is being employed for the measurement may be determined by the positions on the scale of the altitude and distance indications 109 and 113, respectively.

Thus, the invention has been described as a drift indicator for aircraft. The drift indications are obtained by radiating radio frequency energy over divergent paths. The Doppler effect produced by comparing the frequency of the energy in the two paths corresponds to the drift of the aircraft. In one embodiment, the device employed in this method of measuring drift may be calibrated so as to be direct reading. While the general case of symmetrical radiation has been described, it should be understood that the method permits the use of asymmetrical radiation at the disadvantage of a more complicated calculation.

I claim as my invention:

1. A drift indicator for aircraft including, in combination, a source of pulses of radio frequency energy, means for radiating each of said pulses from radiators having a pair of relatively wide angle and divergent radiation patterns, means including said radiators for receiving said pulses of energy after reflection from a surface in one of said radiation patterns, additional means including said radiators for receiving said pulses of energy after reflection from a surface in the other of said radiation patterns, means connected to said receiving means for combining said received pulses, and means including said combining means for selecting and indicating the optimum difference frequency produced by differences in the lengths of the divergent paths of said radiated and received pulses.

2. A drift indicator of the character of claim 18 including means for measuring the ratio of the altitude of said craft to the distance between the aircraft and the earth at the points of reflection of said energy.

3. The method of measuring drift of an aircraft which includes the steps of radiating radio frequency energy from said aircraft along divergent paths, receiving said energy after reflection, selecting from the received energy that received at a predetermined declination angle, comparing the frequency of the energy received at said predetermined declination angle from one of said paths with the frequency of the energy received at said predetermined declination angle from the other of said paths, and indicating drift as a function of the difference in said frequencies.

4. The method of measuring the ground speed of an aircraft which includes the steps of radiating radio frequency energy toward the ground and in the direction in which craft is heading and toward the ground in the direction opposite to said heading, receiving said energy after reflection from the ground beneath and in front of said craft and from the ground beneath and behind said craft, combining said received energy to produce currents having a frequency equal to the difference in the frequency of the energy transmitted and received from said two directions, selecting from said currents the currents corresponding to the energy reflected from a predetermined declination angle, and indicating the ground speed of said craft as a function of the frequency of said selected currents.

5. The method of measuring the drift of an aircraft with respect to a reference line on the surface of the earth which includes the steps of radiating pulses of radio frequency energy toward the surface of the earth and in divergent paths extending on either side of said craft to form relative wide angle beams, receiving said energy after reflection from the earth, selecting from said received energy that received at a predetermined declination angle, combining the selected energy to determine the change in frequency due to the Doppler effect on the energy received over said two paths, and indicating the drift as a function of the equation $$\Delta f = \frac{4fs \sin \theta}{c}$$

where $\Delta f$=change in frequency, $f$=frequency of radiated energy, $s$=ground speed of aircraft, $\sin \theta$ =sine of the angle between the line between the aircraft and earth and the line between the aircraft and point of reflection for satisfactory Doppler effect.

6. The method described in claim 5 including the steps of indicating the altitude of said aircraft and the distance from said aircraft to the point at which said energy is reflected at said predetermined declination angle and maintaining a predetermined ratio of said altitude and distance indications.

7. The method described in claim 3 including the steps of indicating the altitude of said aircraft and the distance from said aircraft to the point at which said energy is reflected at said predetermined declination angle and maintaining a predetermined ratio of said altitude and distance indications.

8. The method of indicating the drift of an aircraft which includes the steps of generating pulses of radio frequency energy, radiating said pulses toward the ground on either side of said craft, separately and directively receiving said energy, limiting the amplitude of the received energy, deriving currents corresponding to the difference frequency of said separately received energy, and indicating the drift as a function of said difference frequency.

9. The method of measuring the drift of an aircraft with respect to a reference line on the surface of the earth which includes the steps of generating pulses of radio frequency energy, radiating said pulses toward the earth along divergent paths on opposite sides of said aircraft, separately and directively receiving said energy after reflection from the earth, limiting the amplitude of the received energy, combining said limited energy to produce currents having a frequency equal to the change in frequency produced by the Doppler effect, determining the frequency of said currents, measuring the altitude of said craft, measuring the distance between said craft and the point at which said energy is reflected from the earth along said divergent paths, and correcting said frequency by a factor corresponding to the ratio of measured altitude to measured distance to determine the drift of said aircraft with respect to said reference line.

10. The method of measuring the ground speed of an aircraft which includes the steps of observing the Doppler effect on radio frequency energy reflected from the ground and produced by the drift of said aircraft, indicating the altitude of the aircraft, indicating the distance of the surface causing said reflections, adjusting the ratio of said indications to maintain a predetermined ratio so that the drift is a function of the observed Doppler effect and is independent of the altitude of said aircraft.

11. The method according to claim 8 including the additional steps of determining whether said drift is to the right or left of said craft by moving said craft to the right and to the left with respect to its longitudinal axis to determine in which direction the observed drift increases.

12. A drift indicator including, in combination, a source of radio frequency energy, means for radiating said energy along divergent paths toward a reflecting surface, means for receiving said energy after reflection from said surface, means for indicating separate reflections returning over paths of different lengths and means for selecting from said separate reflections those limited to energy traveling paths of predetermined length.

13. A drift indicator including, in combination, a source of radio frequency energy, means for radiating said energy along divergent paths toward a reflecting surface, means for receiving and combining energy transmitted at substantially the same time over said paths, means for selecting from the combined energy that received at a predetermined declination angle and means for indicating the frequency of said selected energy.

14. A drift indicator including, in combination, a source of radio frequency energy, means for radiating said energy along divergent paths toward a reflecting surface, means for receiving and combining energy transmitted at substantially the same time over said paths, means for indicating the time between the radiation and the reception of said energy, means for selecting the energy traveling to and from said surface in predetermined time intervals only, and means for indicating the drift as a function of the Doppler frequency of said selected energy.

15. The method of measuring drift of an aircraft which includes the steps of radiating radio frequency energy from said aircraft along divergent paths, receiving said energy after reflection, combining the received signals, separating the signals received over paths and traversing said paths in predetermined time intervals, combining the thus separated signals and indicating drift as a function of the Doppler frequency of the combined signals.

16. A drift indicator including, in combination, a source of radio frequency energy, a bidirectional antenna connected to said source for radiating said radio frequency energy in a pair of divergent paths toward a reflecting surface, means for receiving said energy after reflection from a surface in one of said paths, means for receiving energy after reflection from a surface in the other of said paths, means connected to said two receiving means for combining and selecting the energy received at a predetermined declination angle, and means responsive to said combined and selected energy for indicating the change in frequency due to the Doppler effect.

17. A drift indicator for aircraft including, in combination, a source of radio frequency energy, means for radiating said energy downwardly from said craft along divergent paths, means for receiving said energy after reflection from surfaces in said divergent paths, means for combining the energy received over said paths, means for selecting only the combined energy received over a predetermined declination angle, and means connected to said selecting means for indicating drift with respect to said surfaces as a function of the beats between the energy received at said declination angle.

18. A drift indicator for aircraft including, in combination, a source of radio frequency energy, a directive antenna connected to said source for radiating said energy over two divergent paths, means for receiving directively the radiated energy reflected from the earth over one of said paths, additional means for receiving directively the radiated energy reflected from the earth over the other of said paths, means connected to said receiving means for limiting the amplitude of the received reflected energy, and means connected to said limiting means for combining the thus limited energy to determine the difference between the frequency of the energy traversing said divergent paths.

IRVING WOLFF.